United States Patent [19]
Rolt

[11] Patent Number: 5,857,835
[45] Date of Patent: Jan. 12, 1999

[54] FLUID-COATED TURBINE RATOR DISC FOR A GAS TURBINE ENGINE

[75] Inventor: Andrew Martin Rolt, Derby, England

[73] Assignee: Rolls Royce, PLC, London, England

[21] Appl. No.: 852,531

[22] Filed: May 7, 1997

[30] Foreign Application Priority Data

May 14, 1996 [GB] United Kingdom .................... 9610018

[51] Int. Cl.⁶ ..................................................... F01D 5/08
[52] U.S. Cl. ....................... 416/95; 416/244 A; 415/177; 415/180
[58] Field of Search .................................... 415/115, 116, 415/117, 176, 177, 178, 180; 416/95, 96 R, 96 A, 97 R, 204 R, 204 A, 244 R, 244 A; 403/359

[56] References Cited

U.S. PATENT DOCUMENTS

| | | | |
|---|---|---|---|
| 2,636,665 | 4/1953 | Lombard | 415/115 |
| 2,908,518 | 10/1959 | Gregory et al. | 415/115 |
| 3,222,772 | 12/1965 | Leyner | 403/359 |
| 4,184,797 | 1/1980 | Anderson et al. | 416/95 |
| 5,533,825 | 7/1996 | Stone | 403/359 |
| 5,586,860 | 12/1996 | Bertrand et al. | 415/115 |
| 5,647,683 | 7/1997 | Easley | 403/359 |

FOREIGN PATENT DOCUMENTS

| | | | |
|---|---|---|---|
| 635783 | 4/1950 | United Kingdom | 416/95 |
| 2112461 | 7/1983 | United Kingdom . | |
| 0651137 | 5/1995 | United Kingdom . | |

*Primary Examiner*—Christopher Verdier
*Attorney, Agent, or Firm*—Oliff & Berridge, PLC

[57] ABSTRACT

A rotor disc (15) has an axially enlarged hub portion (18) with a bore (20) through which a turbine shaft (19) extends in a coaxial, radially spaced apart relationship, the annular gap between the hub portion (18) and the shaft (19) receives a flow of temperature regulating fluid. The shaft (19) is provided with axially extending elongate projections (22) to increase the turbulence and relative velocity of the temperature regulating fluid adjacent the projections (22).

7 Claims, 3 Drawing Sheets

FLUID-COATED TURBINE RATOR DISC FOR A GAS TURBINE ENGINE

This invention relates to a turbine for a gas turbine engine. The turbine of a gas turbine engine usually comprises at least one rotor disc which carries an annular array of turbine aerofoil blades. A turbine rotor disc necessarily rotates at high speeds in a hostile environment and as such during the engine cycle the discs and in particular high pressure turbine discs are subject to large rotational stresses and pressure/temperature gradients. These gradients induce thermal stresses within the disc which contribute to the stresses which limit the life of the disc. These conditions are most prevalent during aircraft takeoff conditions.

GB 2112461A discloses a rotor disc having a hub provided with an axial bore within which a shaft is mounted and the shaft is also provided with a fluid flow deflector. The fluid flow deflector is mounted directly on the shaft and redirects the axial airflow which passes between the turbine disc and the shaft thereby reducing thermal gradients within the disc.

However this arrangement suffers from a number of disadvantages. The arrangement increases the resistance to the passage of cooling air by restricting the actual flow area. This reduces the capacity of cooling air to affect the heat transfer characteristics of the disc. In addition such a deflecting element necessarily requires the base of the disc to be suitably shaped to accommodate the element. Also since the deflecting element needs to be positioned in close proximity to the disc undesirable contact between the rotating shaft and the disc may occur.

It is an aim of this invention, therefore, to provide apparatus which attempts to improve turbomachinery disc life without substantially decreasing the mass fluid flow between the base of the disc and the shaft and also alleviate the aforementioned disadvantages.

According to the invention there is provided a turbine suitable for a gas turbine engine comprising a rotor disc having an inner hub portion and outer rim portion, said inner hub portion being provided with an axial bore therethrough whereby said rotor disc accommodates a turbine shaft, an annular gap is defined between said shaft and said inner hub portion for receiving a flow of temperature regulating fluid characterised in that said turbine shaft and/or the radially inner surface of said inner hub portion of said rotor disc is provided with axially extending elongate projections.

Advantageously the provision of such elongate projections on the shaft increases the heat transfer rate at the bore of a corresponding disc without obstructing the airflow or reducing the mass of airflow.

The provision of such projections increases the turbulence and relative velocity of the air adjacent to the disc and thus assists in increasing the heat transfer rates of the disc. The hub of the disc will therefore heat up and cool down more rapidly minimising the hub to rim temperature gradients and thus peak stresses in both the hub and the rim areas of the disc will be reduced.

In one embodiment the projections form an integral part of the turbine shaft itself. Advantageously the shaft may be formed with the ribs formed therein thus dispensing with the need for a separate outer sleeve portion which forms part of the shaft once in place.

In another embodiment the radially inner portion of the disc could also be provided with ribs which advantageously increases the surface area of the portion of the disc and increases turbulence in the adjacent fluid flow.

In an embodiment of the invention the elongate projections comprise ribs.

In another embodiment the ribs may be helical protrusions on the shaft so as to further increase the velocity of the air relative to the disc bore and additionally act as a pump to pump more air through the annular gap and into the adjacent holes provided in the shaft.

The invention will now be described, by way of example, with reference to the accompanying drawings.

Figure 1:
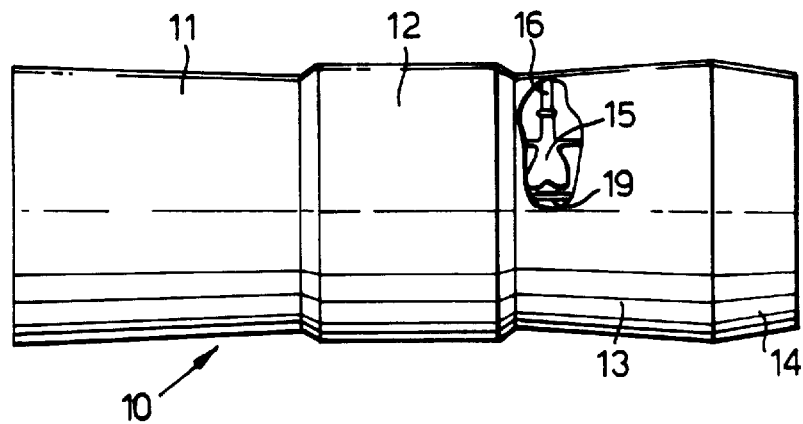
FIG. 1 is a partially broken away side view of a gas turbine which incorporates a turbine in accordance with the present invention.
Figure 2:
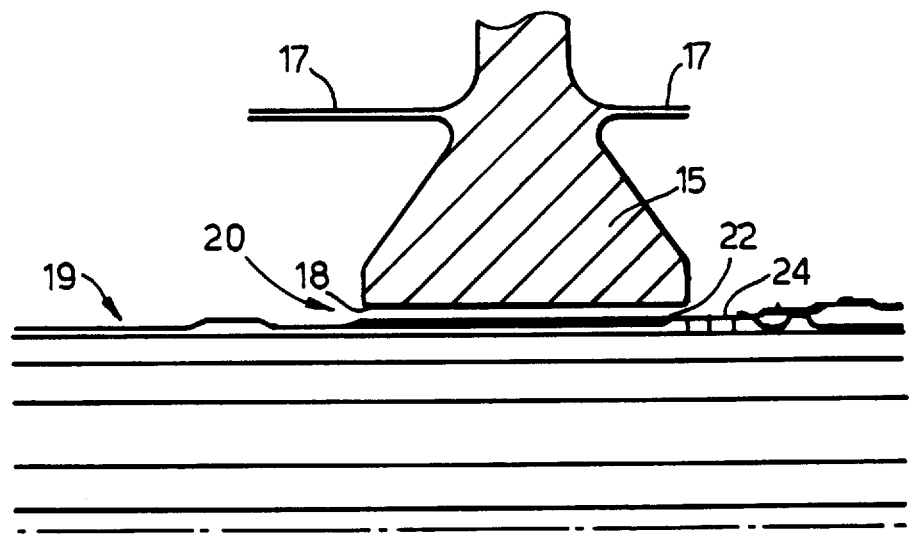
FIG. 2 is a cross section view of a shaft and disc hub portion of the turbine as shown FIG. 1.
Figure 3:
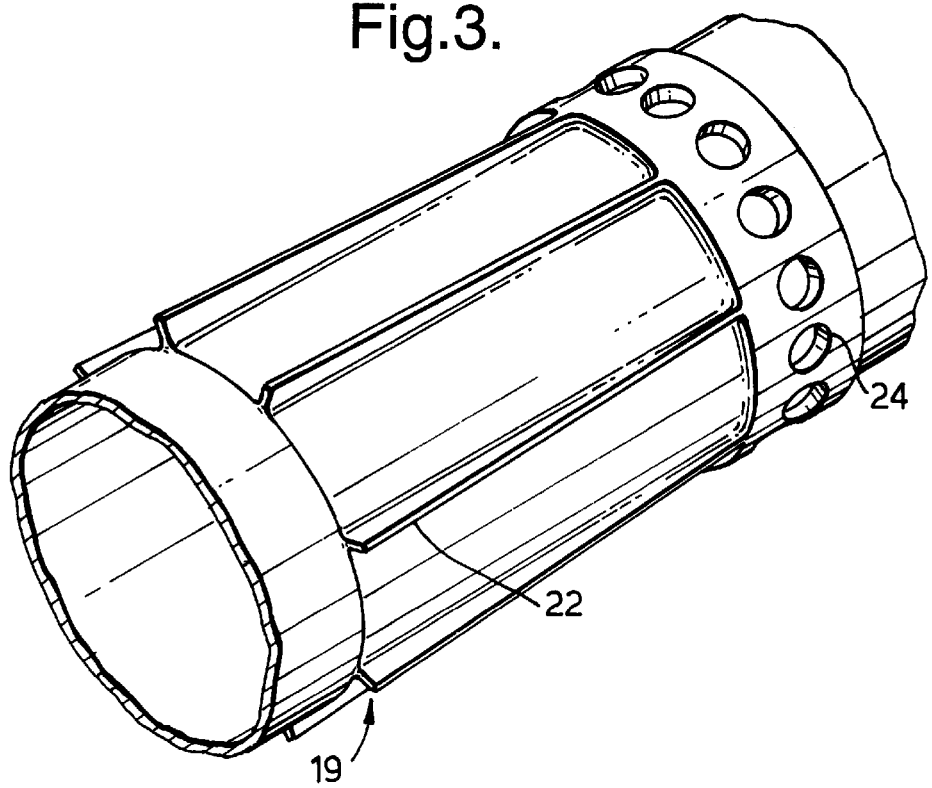
FIG. 3 is an isometric view of the shaft of the turbine as shown in FIG. 1 incorporating the axially extending elongate projections.
Figure 4:
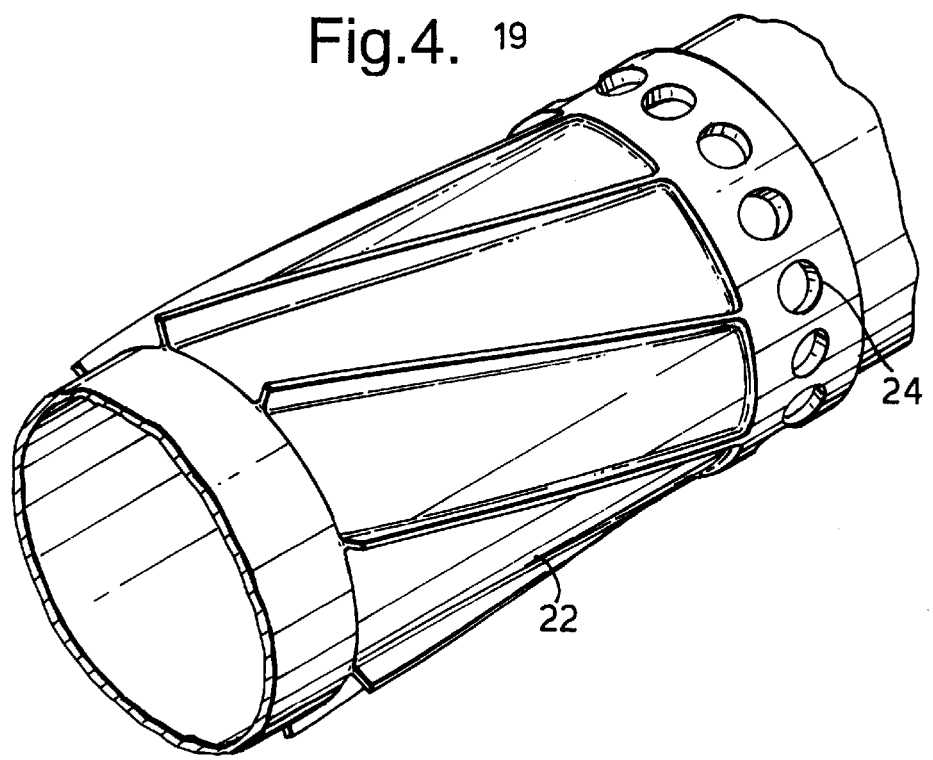
FIG. 4 is an isometric view of the shaft of the turbine as shown in FIG. 1 incorporating helical elongate projections.

With reference to FIG. 1 a gas turbine engine generally indicated at 10 comprises in axial flow series a compressor section 11, combustion equipment 12, a turbine section 13 and a propulsion nozzle 14. The gas turbine engine 10 functions in the usual manner. Thus air drawn into the compressor section 10 is compressed before being mixed with fuel and the mixture ignited in the combustion chamber 12.

The resulting combustion products expand through the turbine section 13 before being exhausted to atmosphere through propulsive nozzle 14.

The turbine section 13 includes a turbine rotor disc 15 which is mounted for rotation therein and is provided with an annular array of aerofoil blades 16 around its periphery. The rotor disc 15 is provided with two axially extending flanges 17 on opposite sides thereof by means of which it is attached to adjacent rotatable structure. The radially inner hub portion 18 of the rotor disc 15 is for reasons of strength, of greater axial thickness than the remainder of the disc. However in order to accommodate a turbine shaft 19 which extends through turbine 13 along the longitudinal axis of the engine 10, an axial bore 20 is provided within the hub portion 18 which is so positioned that the rotor disc 15 accommodates the turbine shaft 19 in a coaxial radially spaced apart relationship.

Figure 5:
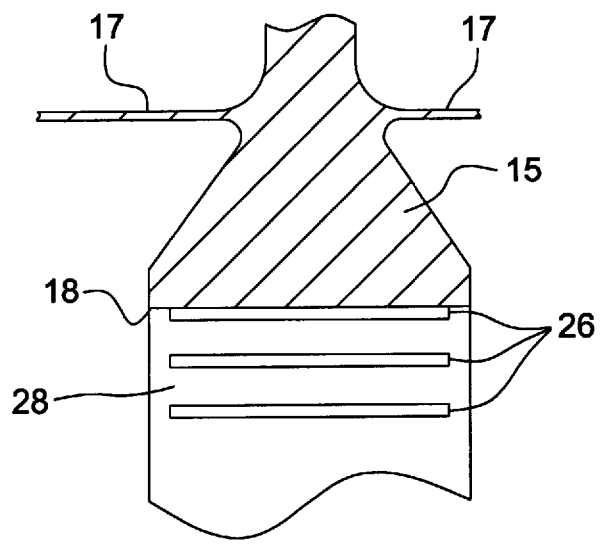
FIG. 5 is a partial cross-sectional view of another embodiment of a disc hub portion of the turbine.

Turbine shaft 19 is provided with a number of ribs 22 extending lengthways along the shaft and a plurality of holes 24 provided circumferentially around the shaft. The ribs 22 ensure that the whirl velocity of the air in the axial bore between the disc 15 and the shaft 19 is of a velocity closer to the whirl velocity of the shaft 19. Thus the hub portion 18 of the disc heats up and cools down more rapidly minimising hub to rim temperature gradients. Cooling air from the high pressure compressor (not shown) adjacent the high pressure turbine is directed between the turbine shaft 19 and the disc hub portion 18 through the annular gap therebetween. This air is then directed into the holes 24 assisted by the pumping action of the ribs on the shaft 19 which provide an increase of mass flow of air and/or a reduced air flow area, both effects enabling the cooling air to pass more easily through the holes 24 in the shaft. The pumping action of the ribs is particularly beneficial when the ribs 22 are shaped in a helix formation. The provision of ribs 22 also increases the turbulence and relative velocity of the air adjacent the disc hub 18 thereby increasing the heat transfer rate. Ribs 26 may also be formed on a radially inner surface 28 of radially inner hub portion 18, as shown in FIG. 5, instead of or in addition to ribs 22 formed on turbine shaft 19. Turbine shaft 19 is not shown in FIG. 5 to better illustrate ribs 26 formed on the inner surface of inner hub portion 18.

It is envisaged that this invention would be of particular relevance to contra-rotating shafts since in this particular case there is a large relative velocity between the disc and the shaft.

I claim:

1. A turbine for a gas turbine engines comprising a rotor disc having an inner hub portion, said inner hub portion being provided with an axial bore therethrough whereby said rotor disc accommodates a turbine shaft in a coaxial radially spaced-apart relationship, an annular channel being defined between said shaft and said inner hub portion for receiving a flow of temperature regulating fluid wherein a radially outer surface of said turbine shaft and/or a radially inner surface of said inner hub portion of said rotor disc is provided with generally axially extending elongate projections.

2. A turbine according to claim 1 wherein said elongate projections form an integral part of the turbine shaft.

3. A turbine according to claim 1 wherein said elongate projections comprise ribs.

4. A turbine according to claim 3 wherein said ribs are formed as helical projections.

5. A turbine according to claim 1 wherein said elongate projections are positioned directly beneath the hub of the rotor disc.

6. A turbine according to claim 1 wherein said elongate projections are positioned adjacent and upstream of circumferential holes formed within the shaft.

7. The turbine of claim 1, wherein the rotor disc is rotatable relative to the turbine shaft.

\* \* \* \* \*

REEXAMINATION CERTIFICATE (4049th)

United States Patent [19]
Rolt

[11] B1 5,857,835

[45] Certificate Issued Apr. 18, 2000

[54] FLUID-COATED TURBINE ROTOR DISC FOR A GAS TURBINE ENGINE

[75] Inventor: Andrew Martin Rolt, Derby, United Kingdom

[73] Assignee: Rolls-Royce PLC, London, United Kingdom

Reexamination Request:
No. 90/005,387, Jul. 7, 1999

Reexamination Certificate for:
Patent No.: 5,857,835
Issued: Jan. 12, 1999
Appl. No.: 08/852,531
Filed: May 7, 1997

[30] Foreign Application Priority Data

May 14, 1996 [GB] United Kingdom .................... 9610018

[51] Int. Cl.⁷ ..................................................... F01D 5/18
[52] U.S. Cl. ........................ 416/95; 416/244 A; 415/177; 415/180
[58] Field of Search ...................... 415/115, 116, 415/117, 176, 177, 178, 180; 416/95, 96 R, 96 A, 97 R, 204 R, 204 A, 244 R, 244 A; 403/359

[56] References Cited

U.S. PATENT DOCUMENTS

| 2,636,665 | 4/1953 | Lombard . |
| 3,391,540 | 7/1968 | Bauger et al. . |
| 4,719,747 | 1/1988 | Willkop et al. . |
| 5,537,814 | 7/1996 | Nastuk et al. . |

FOREIGN PATENT DOCUMENTS

| 0 170 938 | 2/1986 | European Pat. Off. . |
| 0 543 627 | 5/1993 | European Pat. Off. . |
| 2 266 927 | 11/1993 | European Pat. Off. . |
| 2 406 069 | 5/1979 | France . |
| 121367 | 1/1919 | United Kingdom . |

*Primary Examiner*—Christopher Verdier

[57] ABSTRACT

A rotor disc (15) has an axially enlarged hub portion (18) with a bore (20) through which a turbine shaft (19) extends in a coaxial, radially spaced apart relationship, the annular gap between the hub portion (18) and the shaft (19) receives a flow of temperature regulating fluid. The shaft (19) is provided with axially extending enlongate projections (22) to increase the turbulence and relative velocity of the temperature regulating fluid adjacent to projections (22).

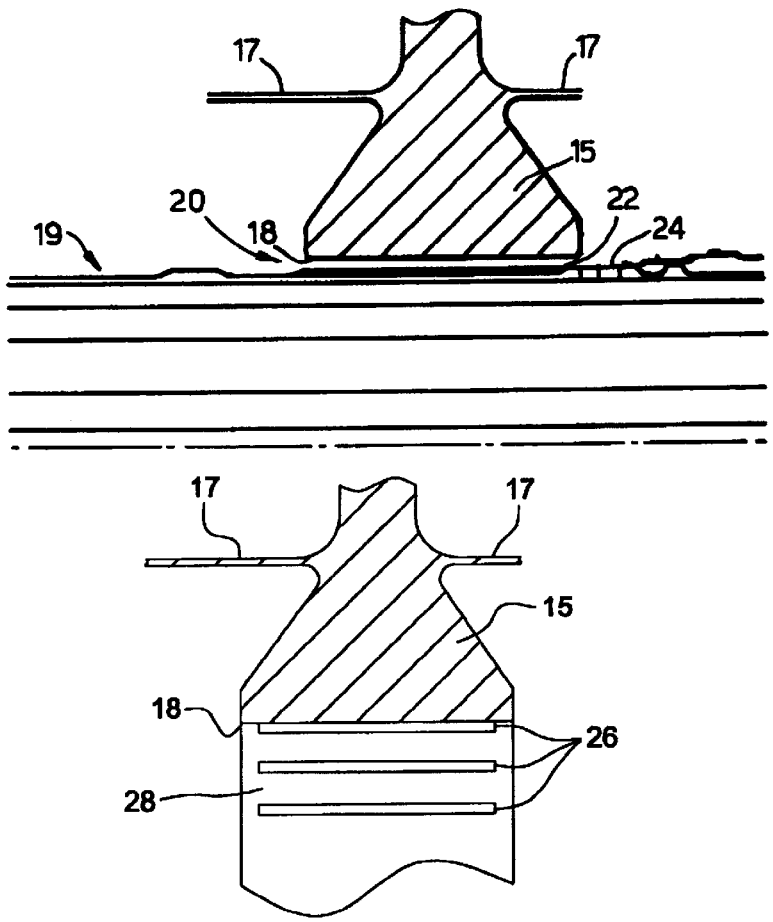

REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 5 is cancelled.

Claim 1 is determined to be patentable as amended.

Claims 2–4, and 6–7, dependent on an amended claim, are determined to be patentable.

New claims 8–14 are added and determined to be patentable.

1. A turbine for a gas turbine engine, comprising a rotor disc having an inner hub portion, said inner hub portion being provided with an axial bore therethrough whereby said rotor disc accommodates a turbine shaft in a coaxial radially spaced-apart relationship, an annular channel being defined between said shaft and said inner hub portion for receiving a flow of temperature regulating fluid wherein a radially outer surface of said turbine shaft and/or a radially inner surface of said inner hub portion of said rotor disc is provided with generally axially extending enlongate projections *that are positioned directly beneath a majority of an axial length of the radially inner surface of the inner hub portion of the rotor disc.*

*8. A turbine according to claim 1, wherein the enlongate projections extend continuously along a substantial portion of the axial length of the radially inner surface of the inner hub portion of the rotor disc.*

*9. A turbine according to claim 8, wherein the elongate projections extend continuously along the entire axial length of the radially inner surface of the inner hub portion of the rotor disc.*

*10. A turbine for a gas turbine engine, comprising a rotor disc having an inner hub portion, said inner hub portion being provided with an axial bore therethrough whereby said rotor disc accommodates a turbine shaft in a coaxial radially spaced-apart relationship, an annular channel being defined between said shaft and said inner hub portion for receiving a flow of temperature regulating fluid wherein a radially outer surface of said turbine shaft and/or a radially inner surface of said inner hub portion of said rotor disc is provided with generally axially extending elongate projections, the elongate projections including ribs that are formed as helical projections.*

*11. A turbine for a gas turbine engine, comprising a rotor disc having an inner hub portion, said inner hub portion being provided with an axial bore therethrough whereby said rotor disc accommodates a turbine shaft in a coaxial radially spaced-apart relationship, the inner hub portion being symmetrical about a plane that extends perpendicular to an axial direction of the turbine shaft, an annular channel being defined between said shaft and said inner hub portion for receiving a flow of temperature regulating fluid wherein a radially outer surface of said turbine shaft and/or a radially inner surface of said inner hub portion of said rotor disc is provided with generally axially extending elongate projections that are positioned directly beneath the inner hub portion of the rotor disc so as to modify thermal characteristics of the inner hub portion.*

*12. A turbine according to claim 11, wherein the enlongate projections extend continuously along a substantial portion of the axial length of the radially inner surface of the inner hub portion of the rotor disc.*

*13. A turbine according to claim 12, wherein the elongate projections extend continuously along the entire axial length of the radially inner surface of the inner hub portion of the rotor disc.*

*14. A turbine according to claim 11, wherein the elongate projections are positioned directly beneath a majority of the axial length of the radially inner surface of the inner hub portion of the rotor disc.*

* * * * *